(12) United States Patent
Schmidt et al.

(10) Patent No.: US 11,521,324 B2
(45) Date of Patent: Dec. 6, 2022

(54) TERRAIN-BASED AUTOMATED DETECTION OF WELL PADS AND THEIR SURROUNDINGS

(71) Applicant: International Business Machines Corporation, Armonk, NY (US)

(72) Inventors: Tim Schmidt, Frankfurt am Main (DE); Levente Klein, Tuckahoe, NY (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 16/904,747

(22) Filed: Jun. 18, 2020

(65) Prior Publication Data
US 2021/0398289 A1 Dec. 23, 2021

(51) Int. Cl.
*G06T 7/00* (2017.01)
*G06T 7/13* (2017.01)
*G06N 3/04* (2006.01)
*G06N 3/08* (2006.01)
*E21B 41/00* (2006.01)

(52) U.S. Cl.
CPC .............. *G06T 7/13* (2017.01); *G06N 3/0454* (2013.01); *G06N 3/08* (2013.01); *E21B 41/00* (2013.01); *E21B 2200/20* (2020.05); *G06T 2207/10036* (2013.01); *G06T 2207/20081* (2013.01); *G06T 2207/20084* (2013.01); *G06T 2207/30188* (2013.01)

(58) Field of Classification Search
CPC .............. G06T 7/13; G06T 2207/10036; G06T 2207/20081; G06T 2207/20084; G06T 2207/30188; G06N 3/0454; G06N 3/08; E21B 41/00; E21B 2200/20; G06V 20/188; G06V 20/176; G06V 20/194; G06K 9/627
See application file for complete search history.

(56) References Cited

U.S. PATENT DOCUMENTS

| 8,204,692 B2 | 6/2012 | Arango et al. |
| 10,217,236 B2 | 2/2019 | Kraft et al. |
| 10,460,169 B1 * | 10/2019 | Adler .................. G06K 9/6256 |
| 2016/0282508 A1 | 9/2016 | Murr et al. |

(Continued)

FOREIGN PATENT DOCUMENTS

| CN | 104806226 B | 8/2018 |
| WO | 2008076426 A2 | 6/2008 |

OTHER PUBLICATIONS

Muhammad ("Data mining applications in hydrocarbon exploration", Artificial Intelligence Review, Kluwer Academic Publishers, DO, vol. 35, No. 1, Nov. 27, 2010 (Nov. 27, 2010), pp. 1-18, XP019871913, ISSN 1573-7462,DOI: 10.1007/S10462-010-9180-Z) (Year: 2010).*

(Continued)

*Primary Examiner* — Ping Y Hsieh
(74) *Attorney, Agent, or Firm* — Cantor Colburn LLP; Joseph Petrokaitis

(57) ABSTRACT

Aspects of the invention include includes detecting, using a first machine learning model, a first well pad at a first location based at least in part on a first set of data comprising spectral data describing a gas emission from the first location. Detecting an environmental event within a threshold distance of the well pad. Determining a probability of damage to the first well pad from the environmental event.

17 Claims, 7 Drawing Sheets

(56) References Cited

U.S. PATENT DOCUMENTS

| | | |
|---|---|---|
| 2017/0018039 A1 | 1/2017 | Collum, Jr. et al. |
| 2017/0364795 A1 | 12/2017 | Anderson et al. |
| 2018/0039885 A1 | 2/2018 | Albrecht et al. |
| 2018/0137355 A1 | 5/2018 | Rostand et al. |
| 2019/0102622 A1 | 4/2019 | Spalenka et al. |
| 2019/0195689 A1 | 6/2019 | McQuilkin et al. |

OTHER PUBLICATIONS

Groener ("A Comparison of Deep Learning Object Detection Models for Satellite Imagery", 2019 IEEE Applied Imagery Pattern Reecognition Workshop (AIPR), IEEE, Oct. 15, 2019 (Oct. 15, 2019), pp. 1-10, XP033814626, DOI: 10.1109/AIPR47015.2019.9174593) (Year: 2019).*

Zhang et al., "Localization and Quantification of Trace-gas Fugitive Emissions Using a Portable Optical Spectrometer", Paper: Apr. 17, 2018 19 Pages.

Groener Austen et al: "A Comparison of Deep Learning Object Detection Models for Satelite Imagery", IEEE Applied Imagery Pattern Recognation Workshop (AIPR); (2019), pp. 1-10.

International Search Report; International Application No. PCT/EP2021/064215; International Filing Date: May 27, 2021; dated Sep. 21, 2021; 17 pages.

Muhammad Shaheen et al., "Data mining applications in hydrocarbon exploration", Artificial Intelligence Review, Kluwer Academic Pubisher, vol. 35, No. 1 27 (2011), pp. 1-18.

\* cited by examiner

TERRAIN-BASED AUTOMATED DETECTION OF WELL PADS AND THEIR SURROUNDINGS

BACKGROUND

The present invention generally relates to computer-based detection systems, and more specifically, to a terrain-based automated detection of a well pad and its surroundings under operating conditions.

Pad drilling is a drilling technique, in which multiple wellbores are drilled from a single, compact piece of land known as a well pad. A wellbore is a hole that defines an oil well. A well pad is a tract of land that has been cleared for a drilling rig to drill a wellbore. A well pad is typically between four and five square acres and can include any number of oil wells. Pad drilling uses vertical drilling in conjunction with horizontal drilling. A drilling rig drills a wellbore straight down into the ground and once the wellbore reaches a certain depth, the drilling rig drills horizontally in any given direction. Once the drilling rig is finished drilling the well, an oil rig is placed to extract any oil from the ground. The oil extraction process requires specialized equipment, including the oil rig, protective barriers, and storage tanks.

SUMMARY

Embodiments of the present invention are directed to a terrain-based automated detection of well pads. A non-limiting example computer-implemented method includes detecting, using a first machine learning model, a first well pad at a first location based at least in part on a first set of data comprising spectral data describing a gas emission from the first location. Detecting an environmental event within a threshold distance of the well pad. Determining a probability of damage to the first well pad from the environmental event.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide systems and methods that use machine learning techniques on spatially related imagery to identify physical structures to identify well pads and assess the risk of flooding, wildfire, landsides to those well pads.

Commercial enterprises and regulatory agencies need accurate information regarding the number and location of well pads to determine emission levels, accurately assess risks. Current regulations require that well pad operators cease operations under certain environmental events, such as flooding, landslides, and wildfire in the area surrounding well pads. In the event of a flooding, landslide, or wildfire, regulatory agencies have to verify that the operators have ceased operation of nearby well pads.

It is therefore desirable to have an ability to remotely detect harmful environmental events near a well pad and calculate the distance between the center point of such environmental events and any nearby well pads. It is also desirable to calculate the rate at which the environmental events approach any well pad and calculate a time of arrival to provide advance warning to the well pad operators. Conventional computer-based detection systems rely on photographic imagery composed of red, green, and blue (RGB) bands for object classification by machine learning algorithms. However, these machine-learning algorithms are often trained on outdated training and inaccurate training data. The information is often provided in different formats depending on the source, which can result in a high margin of error.

One or more embodiments of the present invention address one or more of the above-described shortcomings by providing methods and systems that use spectral image data to detect a combination of terrain, oil extraction equipment, and gas emissions to identify well pads. The spectral information extracted from the satellite can be also used to detect infrared or high thermal signatures that can be indicative of wildfire, flooding, and landslides. The herein described methods and systems further generate real-time and current training data to train machine learning units used to identify the well pads and any nearby environmental conditions.

Figure 1:
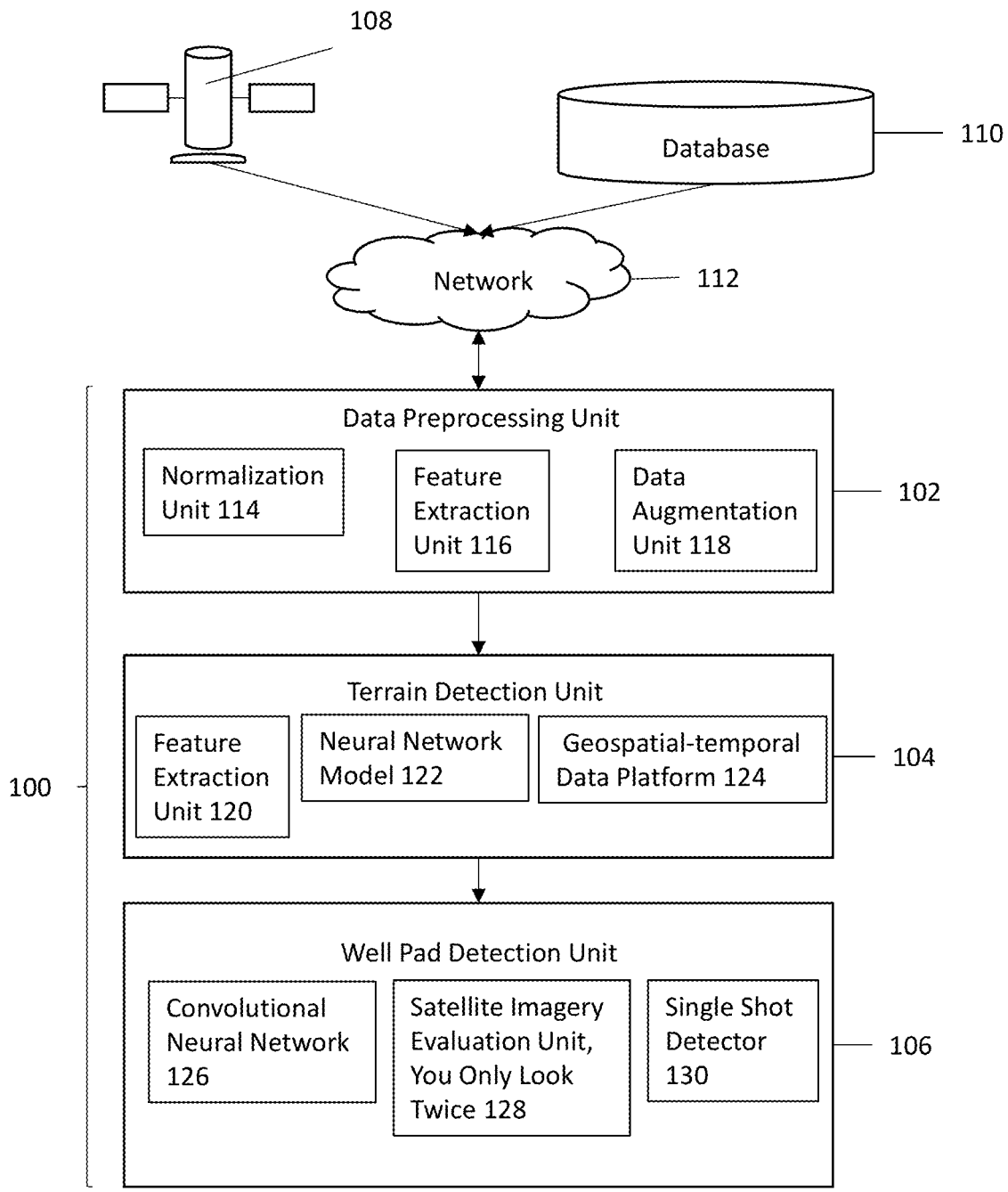
FIG. 1 illustrates a block diagram of components of a well pad detection system in accordance with one or more embodiments of the present invention.

Turning now to FIG. 1, a well pad detection system 100 is generally shown in accordance with one or more embodiments of the present invention. The well pad detection system 100 includes a data preprocessing unit 102, a terrain detection unit 104, and a well pad detection unit 106. The well pad detection system 100 is also operable to exchange data with at least one sensor 108 and at least one database 110 via a communication network 112. The sensor 108 can be attached to a satellite, aircraft, balloon, unmanned aerial vehicle (UAV), or other aerial source. The database 110 can be any storage device that includes data describing a parcel of land.

The data preprocessing unit 102 receives data describing a parcel of land and prepares the data for analysis by the terrain detection unit 104 and the well pad detection unit 106. The data preprocessing unit 102 can receive the data from multiple sources and is operable to organize the received data regardless of the source. The data can include satellite imagery, spectral imagery, digital maps, or other data describing a parcel of land. The data can be organized, for example, based on one or more of a location, a time of capture, a change detected based on a reference image, proximity to an environmental event, a level of oil production, a level of detected gases, or other appropriate criteria. The data preprocessing unit 102 includes a normalization unit 114 to normalize data from different sources (i.e., different sensor(s) 108 and database(s) 110). The data preprocessing unit 102 further includes a feature extraction unit 116 for extracting specific features from the data such terrain-related features, well pad-related features, and environmental event-related features. For example, a well pad's terrain generally includes flat rectangular portions of land, little to no vegetation, and a distribution of drilling equipment. The feature extraction unit 116 can extract features indicative of these characteristics from the data, including from spectral signatures and/or satellite imagery. The feature extraction unit 116 can also extract features describing the surrounding area, such as the types of vegetation and natural structures including mountains, caves, and bodies of water.

In some instances, one or more of these features can be associated with areas that do not include a well pad. Therefore, in order to distinguish terrain that can include a well pad from terrain that would not include a well pad, the feature extraction unit 116 can also identify features that can be associated with the other terrain. The feature extraction unit 116 can further encode the data with metadata to indicate whether the feature is indicative of a terrain with a well pad or without a well pad. The feature extraction unit 116 can also extract features that are indicative of terrains that are similar to a well pad terrain, but do not include a well pad. For example, some agricultural settings include one or more features associated with well pad terrains, but do not include any well pads. Therefore, the feature extraction unit 116 can extract features associated with agricultural crops or farm-related structures. This information can be used to allow the terrain detection unit 104 and the well pad detection unit 106 to distinguish between well pad terrains and other terrains.

The data preprocessing unit 102 further includes a data augmentation unit 118. Training machine learning units typically require large data sets. The data augmentation unit 118 creates new data points/images by manipulating the original data. For example, the data augmentation unit 118 can receive image data and create multiple alterations of the images to increase the size of training data. The alterations can include generating a mirror image, rotating an image, altering a color, cropping an image, scaling an image, or other alteration. The altered images are, in turn, appended to the original data set to create a larger data set to train the terrain detection unit 104 and the well pad detection unit 106. The data augmentation unit 118 can use different augmentation techniques such as geometric transformations, color space augmentations, kernel filters, mixing images, random erasing, feature space augmentation, adversarial training, generative adversarial network (GAN), neural style transfer, and meta-learning.

The terrain detection unit 104 can receive data from the data preprocessing unit 102 and analyze the data for terrain features that are indicative of a well pad. The terrain feature extraction unit 120 detects features indicative of a terrain associated with a potential well pad. The features indicative of a terrain are analyzed by the terrain neural network model 122 to characterize the terrain (i.e., flat or rough, vegetative or non-vegetative, boundaries, natural features, etc.). The terrain neural network model 122 can further track changes to a terrain from a historical snapshot or image of the terrain. The snapshot is considered to be a "baseline" and the terrain neural network model 122 can identify in space and time where such changes occurred from the baseline. These changes can be new construction, new equipment, changes in land use, changes in vegetation, types of vegetation, and water body levels. By detecting changes, the terrain detection unit 104 can determine whether any changes are indicative of a well pad. For example, road construction, may be indicative of a road being built to a well pad.

When classifying a terrain of an unanalyzed piece of land, the terrain feature extraction unit 120 receives data from the data preprocessing unit 102 and a geospatial-temporal data platform 124. The geospatial-temporal data platform 124 includes a repository of data including maps, satellite imagery, weather drone data, and sensor-based device data. The data from both the terrain feature extraction unit 120 and the geospatial-temporal data platform 124 can relate to a particular parcel of land. The data received from the geospatial-temporal data platform 124 is used to augment the data received from the data preprocessing unit 102. The terrain feature extraction unit 120 processes the augmented data and extracts any terrain-related features.

The terrain neural network model unit 122 can receive the extracted features from the terrain feature extraction unit 120 and process the information to classify the terrain of the land. The terrain can be topography that describes, for example, the elevation of the land, vegetation, and man-made construction (roads, buildings, infrastructure). The terrain can also include a proximity of a location on the land to any other features such as rivers, roads, mountains, and buildings. The terrain neural network model unit 122 can analyze data, for example, a raster or bit map image, that stores the information of the terrain to determine whether a location has a terrain that is likely associated with a well pad.

Based on the data, the terrain neural network model unit 122 can determine characteristics of a parcel of land, such as slope, presence of gases, and types of vegetation. For example, the slope of terrain can be determined by looking at the difference in values of two adjacent pixels in image data. If the difference is zero, the terrain is flat. If, however, the difference is a positive number then the slope is tilted toward the first pixel used for calculating the difference while a negative slope indicates that the terrain can be tilted to the second pixel. By examining spectral image data, the terrain neural network model unit 122 can identify gases and create a density map of gas concentration over the parcel of land. Also, terrain neural network model unit 122 can detect vegetation can by comparing the spectral characteristics from images with a vegetation index (e.g., Normalized Difference Vegetation Index). As sunlight strikes different vegetation, the vegetation will absorb certain wavelengths and reflect other wavelengths. Vegetation cell structure has evolved to reflect near-infrared (NIR) wavelengths light, whereas the chlorophyll or the plant's pigment absorbs the visible wavelengths of light. Therefore, if, the terrain feature extraction unit 120 determines that a portion of an image displays a higher percentage of infrared light over visible light, it can classify the portion as having dense vegetation versus a sparse vegetation. The terrain neural network model unit 122 can also identify an environmental event, such as flooding, landslides, or wildfire. For example, the terrain neural network model unit 122 can receive time-series data and determine that a position of identified fire or water is changing and moving in a direction. In other instances, the terrain neural network model unit 122 can analyze time-series data and determine that a position of objects, (i.e., rocks, trees or buildings) are moving in a same direction and determine that a landslide is occurring.

Figure 3A:
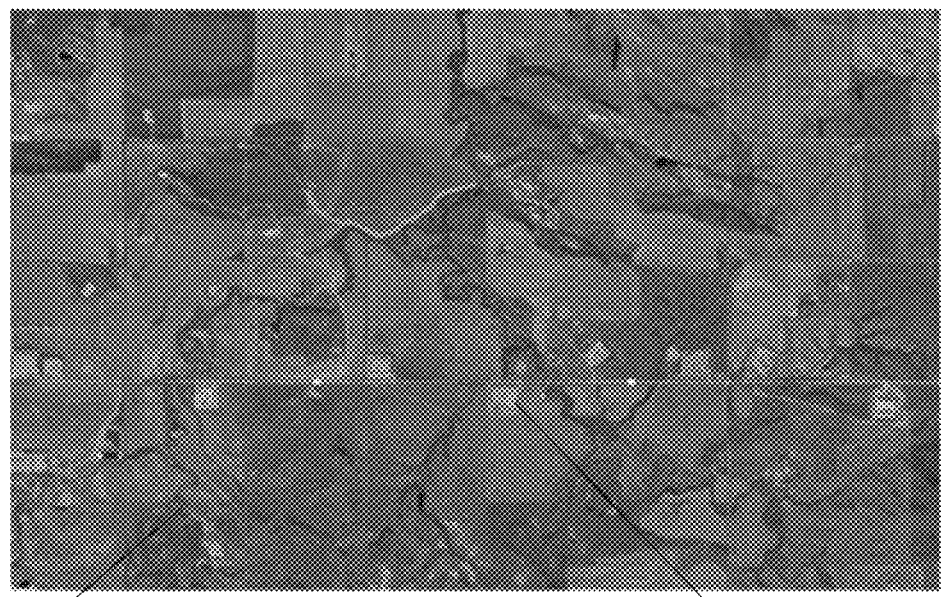
FIG. 3A depicts a map with illustrated well pad boundaries in accordance with one or more embodiments of the present invention.
Figure 3B:
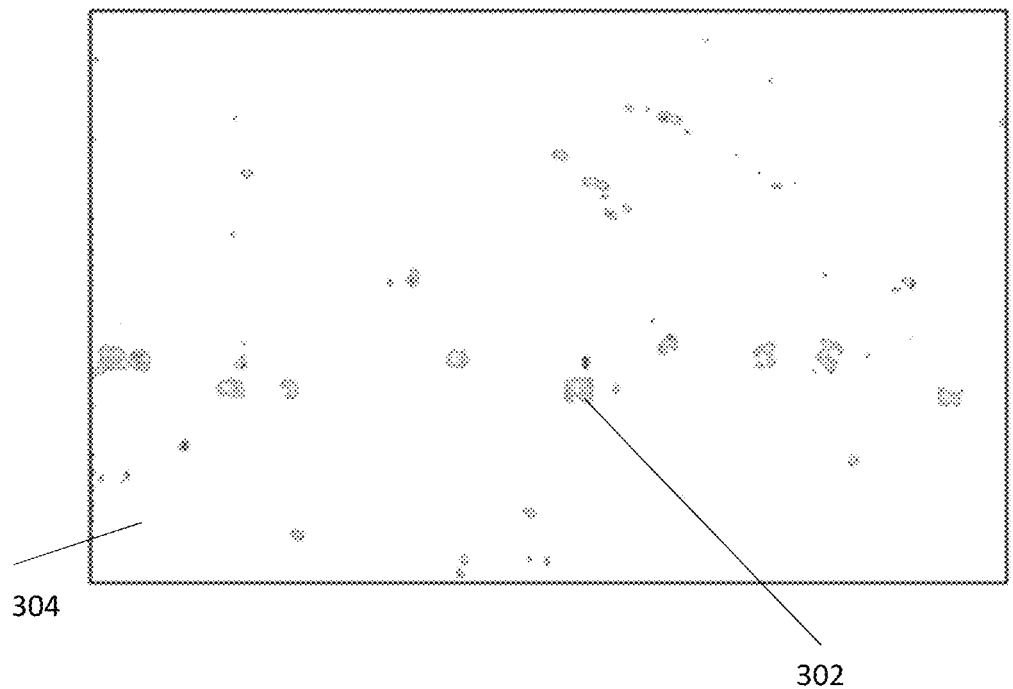
FIG. 3B depicts the well pad boundaries without visible light imagery in accordance with one or more embodiments of the present invention.

The terrain neural network model unit 122 can identify a portion of land as a potential well pad location based on the characteristics of the terrain. The terrain neural network model unit 122 bases identification in part on the terrain having characteristics of a terrain of a pre-identified well pad. For example, a pre-identified well pad terrain generally includes a portion of land characterized as a geometric shape with no vegetation, and the size of the geometric shape is within a threshold of an average geometric-shaped area around a well pad with no vegetation, the terrain neural network model unit 122 can identity the terrain as a potential location of a well pad. After determining that the data describes a potential location of a well pad, the terrain neural network model unit 122 can encode the data to segment the potential location of the well pad. The boundaries can be in the form code readable by a machine. The code can also direct the well pad detection system 100 to augment any images of the land with an illustrated boundary defining the potential well pad as seen in FIGS. 3A and 3B. The terrain neural network model unit 122 can then label the segmented image to identify each potential well pad location in the area.

In addition to delineating a boundary for the potential well pad, terrain neural network model unit 122 can classify objects in the terrain surrounding each potential well pad. For example, using spectral imagery, data from the geospatial-temporal data platform, and vegetation index, the terrain neural network model unit 122 can classify the density or type of the vegetation surrounding each potential well pad. The terrain neural network model unit 122 can also identify other objects within the vicinity of the potential well pad. For example, using data provided by the geospatial-temporal data platform 124, the terrain neural network model unit 122 can identify and determine a proximity to other locations such as mountain, water, or cities. The terrain neural network model unit 122 can further determine a probability of a well pad being in proximity of each identified vegetation, object; and/or having a particular terrain profile. In the analysis, the distance between a location of a potential well pad and an object are calculated based on the line of sight. Such calculations are carried out in order to identify the closest potential well pads in the area and detect differences or similarities between them.

For example, in many cases there is a minimum distance that is maintained between two well pads that is determined by the lateral extent of pipes used to extract oil from the ground. From geospatial records, the direction and length of any pipe are combined with the distance between the location of the potential well pad and an pre-identified well pad to determine if the location of the potential well pad is outside the minimum distance from the pre-identified well pad.

The terrain neural network model unit 122 can analyze the area surrounding a potential location of a well pad to detect any environmental events, for example, a tornado, hurricane, fire, or flooding that can harm a well pad. In the event that an environmental event is detected, the terrain neural network model unit 122 further analyzes a time series data to determine a rate at which the environmental event is approaching a location of a potential well pad. The terrain detection unit 104 is further operable to determine a threshold safety distance between the location of the potential well pad and the environmental event.

The terrain neural network model unit 122 can also predict whether a portion of land without a well pad would be a suitable for a well pad. For example, if determined oil well pads have a probability greater than a threshold of having one or more particular features (i.e., flat topography, proximity to particular type of vegetation, and proximity to other identified well pads), the terrain neural network model unit 122 can identify land without a well pad, but having the feature(s), as a potential location for a well pad. The terrain neural network model unit 122 can further rank potential locations based on their features. For example, each terrain-related feature can be provided a score reflecting a probability of being associated with a well pad. Based on the score, the terrain neural network model unit 122 can be able to rank one location as a more probable location for a well pad than another location. The terrain neural network model unit 122 can assign each feature from that is either indicative of a suitable or unsuitable location of a well pad and assign it a probability score. Each probability score is an expression of how likely the feature is associated with the terrain of a well pad. Each probability score can further be weighted based on whether the terrain neural network model unit 122 identified a combination of two or more features that leads to a location be more or less suitable for a well pad.

The well pad detection unit 106 receives data from the terrain detection unit 104 for determining whether a location of a potential well pad includes an actual well pad. The well pad detection unit 106 includes a plurality of machine learning models for multi-scale object detection. The well pad detection unit 106 can select a machine learning model based on the identified features of the terrain. For example, the well pad detection unit 106 can use a Regional Convolutional Neural Network (R-CNN) model unit 126. The R-CNN model unit 126 receives data from the terrain detection unit and determines whether a terrain includes a well pad. In some embodiments of the present invention, the R-CNN 126 first generates bounding boxes in an image received from the terrain detection unit and runs a classifier on each bounding box. Upon classification of different objects, the R-CNN model unit 126 removes duplicate classifications and rescores the boxes based on the other detected objects in the image. In other embodiments of the present invention, the well pad detection unit 106 can also use a You Only Look Twice (YOLT) model unit 128. The YOLT model unit 128 increases the sampling rate of images by using sliding windows to assist in looking for small, densely packed objects in an image. Furthermore, the YOLT's neural network architecture is distinguishable from other neural networks by including a denser final convolutional layer. In yet even other embodiments of the present invention, the well pad detection unit 106 can also use a single shot detector (SSD) model unit 130. The SSD model unit 130 includes a backbone model and an SSD head. The backbone model is an image classification neural network used to extract features. The SSD head includes one or more convolutional layers added to the end of the backbone model neural network.

The well pad detection unit 106 selects an appropriate neural network model based on the terrain features determined by the terrain detection unit 104. The well pad detection unit 106 uses the appropriate neural network model to analyze the location of potential well pad to determine the presence of an actual well pad. The well pad detection unit 106 can compare any detected gas with a gas that is associated with a well pad. A gas has its own spectral characteristics and will reflect electromagnetic waves at a specific frequency and wavelength. For example, methane or carbon dioxide are gases that are commonly emitted from a well pad. Therefore, the presence of a gas can be indicative that a location of potential well pad does, in fact, include an actual well pad.

The well pad detection unit 106 can consider a movement of the gas due to wind, temperature gradients, or other phenomena. The well pad detection unit 106 can apply a fluidics model to the gas data to account for turbulence from the wind that can extend the plume spatially and also dissolve the concentration. Such plume dispersion can extend across the image and the neural network is informed about the extent, shape and expected concentration. Based on the application of one or more of the models, the well pad detection unit 106 can then determine a source of the gas to assist in a determination of whether a parcel of land includes a well pad.

The well pad detection unit 106 can further use an appropriate neural network model to compare machinery and equipment detected at a location with machinery associated with a well pad. For example, the well pad detection unit 106 can detect the presence of piping, oil rigs, gas container trucks, and other equipment and machinery to determine whether a location includes a well pad. In some instances, if enough gas is in the air, the spectral characteristics of a gas can overwhelm visible light data showing a physical structure underneath the gas. Therefore, the well pad detection unit 106 can uses an appropriate neural network model to analyze a time series of images of a potential location to determine whether any physical structures are present on the potential well pad.

The well pad detection unit 106 can also determine a probability of an environmental event affecting a well pad. For example, the well pad detection unit 106 uses an appropriate neural network model to analyze terrain data to predict a probability that a location will be affected by an environmental event. For example, how likely a location would be affected by a landslide. The well pad detection unit 106 can also analyze the velocity of a wildfire to determine whether a well pad is in danger from the wildfire. The well pad detection unit 106 is further operable to use natural language processing techniques to analyze historical data such a weather reports, electronic news articles, and other information to optimize the prediction. The well pad detection unit 106 can use the appropriate neural network model and applies the data to predict both the probability that a well pad will be damaged by an environmental event, but also whether a location without a well pad will be affected by an environmental event. In this sense, well pad detection unit 106 can help determine a suitability of a portion of land to be considered a well pad location.

In response to determining that a location includes an actual well pad, the well pad detection unit 106 can also alert a well pad operator in response to environmental event data. Based on the velocity of the environmental event and a minimal safety threshold distance, the well pad detection unit 106 can transmit an alert to a well pad operator including, a description of the environmental event, a velocity of the environmental event, and a time maximum time available to cease operation of the well pad before the environmental event breaches the minimal safety threshold distance. The minimal safety threshold distance can vary based on the environmental event and the terrain.

The well pad detection unit 106 can further use the appropriate neural network model to determine whether a well pad is compliant with existing regulations, including any shutdown orders from a regulatory agency. The well pad detection unit 106 receives as data, the identity and composition of any emitted gases from a well pad and compares the values with threshold values established through regulation to determine whether the well pad is compliant with applicable emissions standards. This including detecting a presence and level of gas emissions after a shutdown order to determine whether the well pad shutdown in response to the order.

The sensor 108 can be any sensor operable to collect data for spectroscopy. Spectroscopy includes the investigation and measurement of data from some portion of the electromagnetic spectrum. The sensor 108, for example, can include a remote imaging sensor such as a moderate-resolution imaging spectroradiometer (MODIS) or Visible Infrared Imaging Radiometer Suite (VIIRS), or a Light Detection and Ranging system (LIDAR) acquired at different wavelengths, that can capture spectral data. The sensor 108 can further include a gas imager that is sensitive to infrared spectral bands to detect chemical plumes that can be generated by oil and gas operations. Spectral bands are the different ranges of electromagnetic signals along the electromagnetic spectrum. Examples of chemical plumes include methane, $CH_4$, that is a gas that escapes from a well pad, Sulphur Dioxide, $SO_2$, that is a natural byproduct of oil and gas, and Nitrogen Dioxide, $NO_2$, that is a gas released from the pumps and compressors of a well pad. The spectral bands can be used to detect the spectral signatures of respective gases. The sensor's spectral range can be configured to include the spectral features of any chemical species of interest.

The well pad detection system 100 receives data from either the sensor 108 or the database 110, and analyzes it to identify a well pad. The data can be recovered in real-time as the sensor 108 passes over a plot of land, or the data can have previously stored in the database 110. The well pad detection system 100 is also operable to receive data from a third party, for example, a company operating a well pad, a municipal taxing authority, a regulatory agency, or an insurance company.

The communication network 112 can include the internet, fiber optics, microwave, xDSL (Digital Subscriber Line), Wireless Local Area Network (WLAN) technology, satellite, wireless cellular technology, Bluetooth technology and/or any other appropriate communication technology.

The phrases "neural network" and "machine learning" broadly describes a function of electronic systems that learn from data. A machine learning system, engine, or module can include a machine learning algorithm that can be trained, such as in an external cloud environment (e.g., the cloud computing environment 50), to learn functional relationships between inputs and outputs that are currently unknown. In one or more embodiments, machine learning functionality can be implemented using a terrain neural network model unit 122 having the capability to be trained to perform a currently unknown function. In machine learning and cognitive science, neural networks are a family of statistical learning models inspired by the biological neural networks of animals, and in particular, the brain. Neural networks can be used to estimate or approximate systems and functions that depend on a large number of inputs.

The terrain neural network model unit 122 can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in the terrain neural network model unit 122 that carry electronic messages between simulated neurons are provided with numeric weights that correspond to the strength or weakness of a given connection. During training, The weights can be adjusted and tuned based on experience, making the terrain neural network model unit 122 adaptive to inputs and capable of learning. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Figure 2A:
FIG. 2A is an image from an aerial source depicting multiple potential well pads.
Figure 2B:
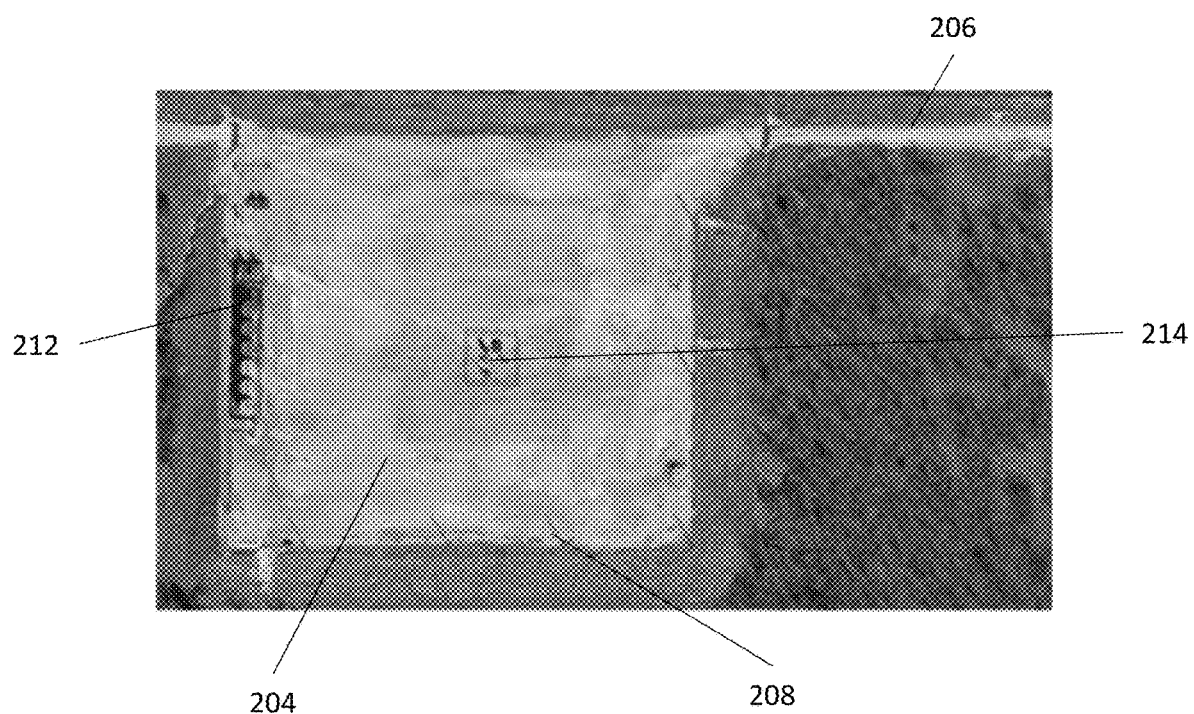
FIG. 2B is an enlarged image depicting a single well pad includes well pad related features.

FIG. 2A is an image of depicting a distribution of well pads 200, 202 across an area. FIG. 2B is an enlarged image of a single well pad 204. As depicted in the FIG. 2B, the well pad 204 has a generally rectangular shape and is in close proximity to a roadway 206. The well pad 204 has a generally flat terrain with little to no vegetation and is surrounded by a protective fencing 208. Storage tanks 212 are located on top of the well pad, and an extraction point 214 has been designated at the center of the well pad 204. A source of pollution can be generated above any of the features or in between these features with a probability distribution across the well pad.

FIG. 3A depicts a boundary delineation map 300 generated from data collected by the sensor 108. The boundary delineation map 300 can include one or more aerial images, such as satellite images or autonomous aircraft images. In some embodiments, a sensor 108 includes a Light Detection and Ranging (LIDAR) system, which measures the distance to a target (e.g., the land) by illuminating the target with a laser light. The boundary delineation map 300 can be generated from one or multiple satellite images of a specific geographic area over a predetermined time span. Each detected well pad 302 includes a boundary delineated on the boundary delineation map 300. FIG. 3B depicts the well pad boundary delineations from the boundary delineation map 300 without the ground surface imagery. Each boundary delineation has a polygonal shape and depicts an outer perimeter of a well pad or an outer perimeter of multiple adjacent well pads.

Figure 4:
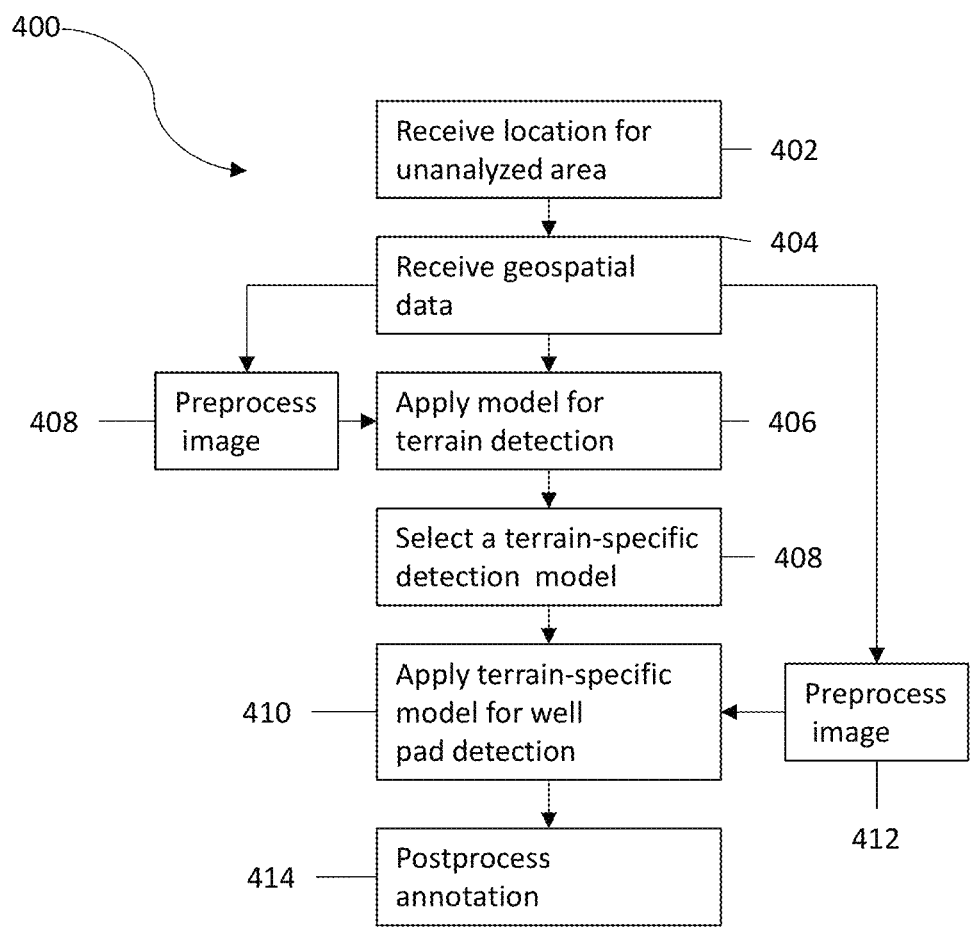
FIG. 4 illustrates a flow diagram of a process for well pad detection in accordance with one or more embodiments of the present invention.

Referring to FIG. 4, a flow diagram of a process for well pad detection in accordance with one or more embodiments of the present invention is shown. At block 202, a well pad detection system receives data in relation to a parcel of land. The land can contain one or more well pads. The data can be received from one or more sources, including an aerial-based source or a database. At block 404, the well pad detection system selects any geospatial data from the data of the analyzed piece of land. Geospatial data refers to any data relating the characteristics of the parcel of land. This includes data describing a surface profile of the land, any structures, pre-identified well pads, equipment, or other man-made objects on the land. Geospatial data also includes any data describing the surrounding terrain as well include proximity to mountains, canyons, bodies of water, and other natural locations. At block 406, the well pad detection system applies a machine learning model to the data to determine terrain-related features of the land. Prior to providing the data to the machine learning model, the well pad detection system preprocesses the data, if not done so previously, at block 408. The well pad detection system further annotates the data with boundaries that identify each portion of the piece of land as a potential well pad. At block 410, the well pad detection system applies a terrain specific machine learning model to the data to classify each potential well pad as either including a well pad or not including a well pad. At block 412, the well pad detection provides any additional preprocessing to the data. The terrain specific machine learning model analyzes the data to determine whether any gases associated with a well pad are being emitted from any of the bounded areas. The terrain specific machine learning model also analyzes the data to determine whether any machinery or equipment associated with a well pad are found in any of the bounded areas. At block 414, the well pad detection system annotates the data as to whether a bounded area includes or does not include a well pad. If any gases are identified, the well pad detection system determine a volume of the gas and a rate of emission based on time series data. The well pad detection system then compares the identity of the gas and a volume of gas to any applicable emissions standards or shutdown orders.

The well pad detection system is further operable to assist in any mitigation of a volume of gas that is emitted within a threshold of or over an emission standard. The well pad detection system also analyzes the composition of the gases above the well pad and calculates a mixing ratio between different gases, it can occur that methane is emitted from a leak while nitrogen dioxide can be emitted by operating equipment. Based on the comparison, the well pad detection system can generate a report disclosing the gas emission and the applicable emission standard. The well pad detection system can further remotely establish a communication to direct an entity to control any oil rig by either slowing the oil rig, speeding up the oil rig, or disabling the oil, based on the gas emission and any applicable emission standard. The well pad detection system can further remotely establish a communication with another aircraft or satellite to alter its course to collect subsequent data to verify the finding or to determine whether the gas emissions have decreased to below the emissions standards or pursuant to a shutdown order.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
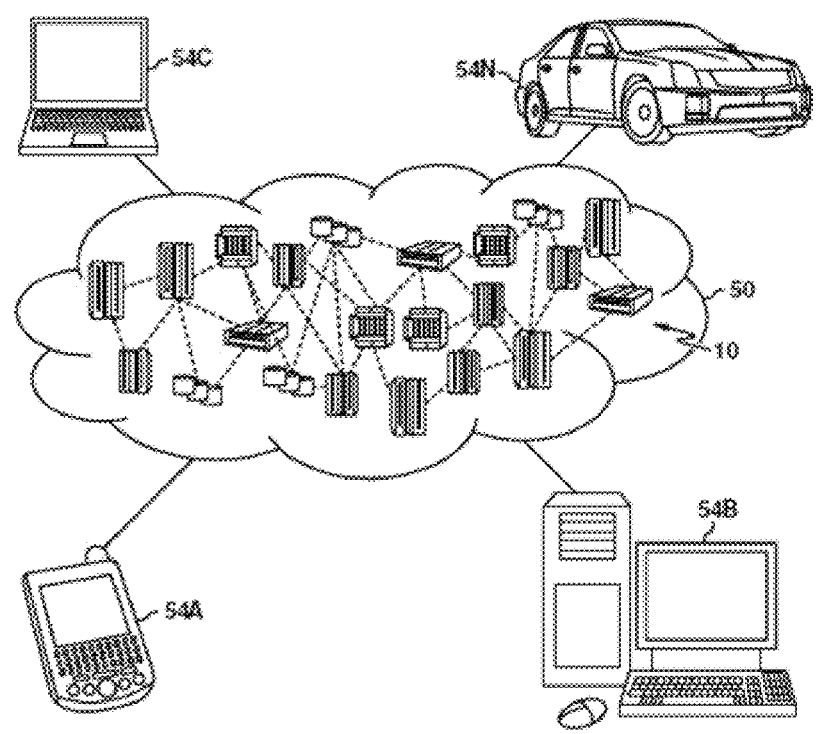
FIG. 5 depicts a cloud computing environment according to one or more embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
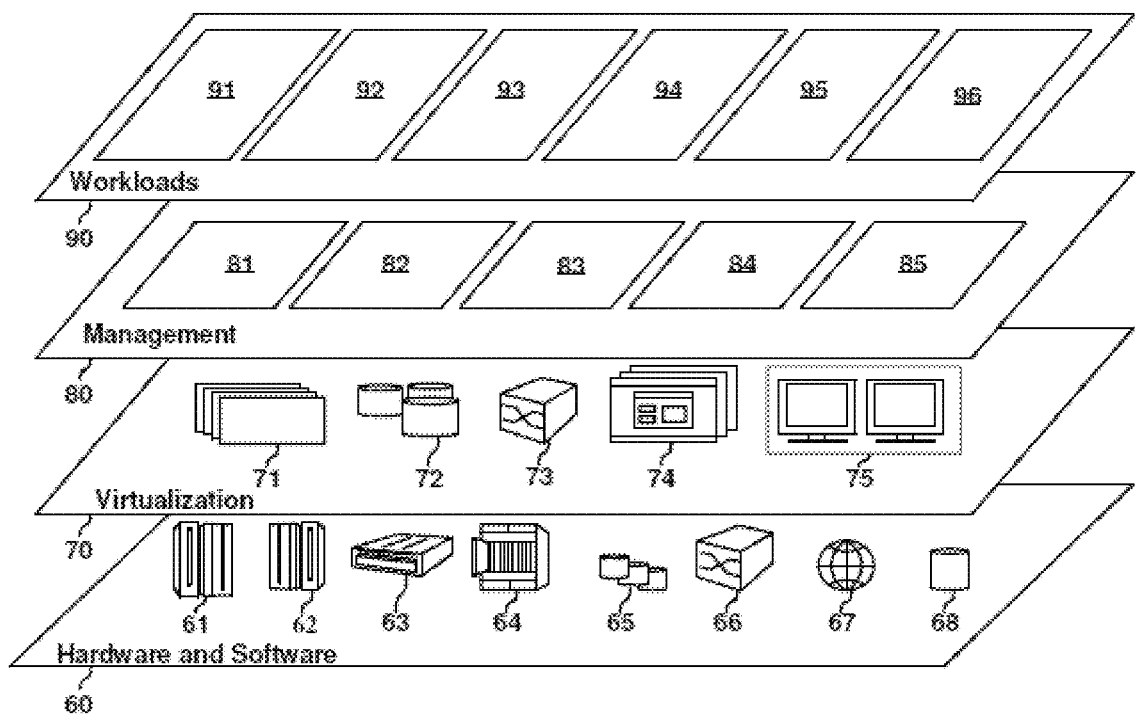
FIG. 6 depicts abstraction model layers according to one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and classifying a well pad from an image 96.

Figure 7:
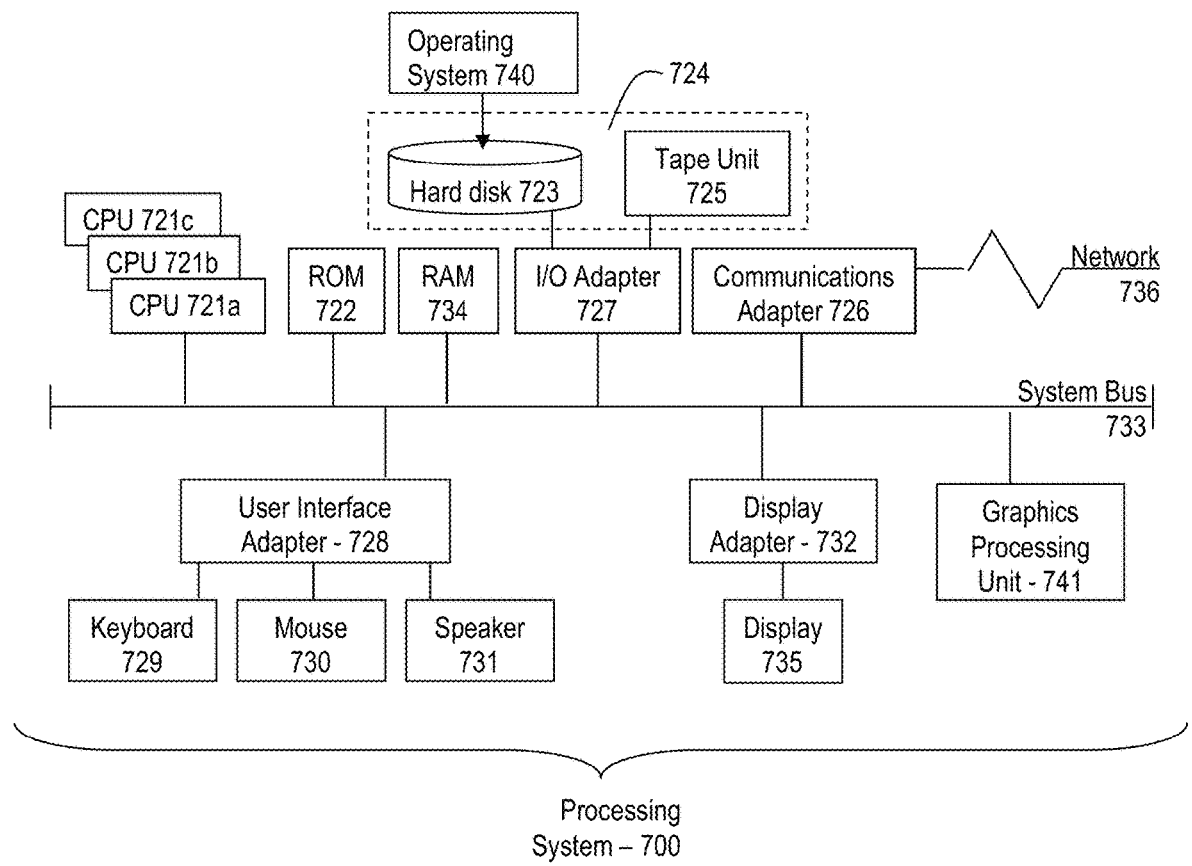
FIG. 7 depicts a block diagram of a computer system for use in implementing one or more embodiments of the present invention.

It is understood that the present disclosure is capable of being implemented in conjunction with any other type of computing environment now known or later developed. For example, FIG. 7 depicts a block diagram of a processing system 700 for implementing the techniques described herein. In examples, the processing system 700 has one or more central processing units (processors) 721a, 721b, 721c, etc. (collectively or generically referred to as processor(s) 721 and/or as processing device(s)). In aspects of the present disclosure, each processor 721 can include a reduced instruction set computer (RISC) microprocessor. Processors 721 are coupled to system memory (e.g., random access memory (RAM) 724) and various other components via a system bus 733. Read only memory (ROM) 722 is coupled to system bus 733 and can include a basic input/output system (BIOS), which controls certain basic functions of the processing system 700.

Further depicted are an input/output (I/O) adapter 727 and a network adapter 726 coupled to the system bus 733. I/O adapter 727 can be a small computer system interface (SCSI) adapter that communicates with a hard disk 723 and/or a storage device 725 or any other similar component. I/O adapter 727, hard disk 723, and storage device 725 are collectively referred to herein as mass storage 734. Operating system 740 for execution on processing system 700 can be stored in mass storage 734. The network adapter 726 interconnects system bus 733 with an outside network 736 enabling processing system 700 to communicate with other such systems.

A display (e.g., a display monitor) 735 is connected to the system bus 733 by display adapter 732, which can include a graphics adapter to improve the performance of graphics intensive applications and a video controller. In one aspect of the present disclosure, adapters 726, 727, and/or 732 can be connected to one or more I/O busses that are connected to the system bus 733 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 733 via user interface adapter 728 and display adapter 732. An input device 729 (e.g., a keyboard, a microphone, a touchscreen, etc.), an input pointer 730 (e.g., a mouse, trackpad, touchscreen, etc.), and/or a speaker 731 can be interconnected to system bus 733 via user interface adapter 728, which can include, for example, a Super I/O chip integrating multiple device adapters into a single integrated circuit In some aspects of the present disclosure, the processing system 700 includes a graphics processing unit 737. Graphics processing unit 737 is a specialized electronic circuit designed to manipulate and alter memory to accelerate the creation of images in a frame buffer intended for output to a display. In general, graphics processing unit 737 is very efficient at manipulating computer graphics and image processing and has a highly parallel structure that makes it more effective than general-purpose CPUs for algorithms where processing of large blocks of data is done in parallel.

Thus, as configured herein, the processing system 700 includes processing capability in the form of processors 721, storage capability including system memory (e.g., RAM 724), and mass storage 734, input means such as keyboard 729 and mouse 730, and output capability including speaker 731 and display 735. In some aspects of the present disclosure, a portion of system memory (e.g., RAM 724) and mass storage 734 collectively store the operating system 740 to coordinate the functions of the various components shown in the processing system 700.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention can or cannot be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    detecting, by a processor and using a first machine learning model, a first well pad at a first location based at least in part on a first set of data comprising spectral data describing a gas emission from the first location;
    detecting, by the processor, an environmental event within a threshold distance of the well pad;
    determining, by the processor, a probability of damage to the first well pad from the environmental event; and
    predicting a suitable location for a second well pad at a second location without a well pad based at least in part on a similarity of a terrain of the second location and the first location and a probability of damage due to the environmental event at the second location.

2. The computer-implemented method of claim 1, wherein the environmental event is a fire, landslide or flooding.

3. The computer-implemented method of claim 1 further comprising extracting, using a second machine learning model, features from the first set of data to determine the terrain of the location.

4. The computer-implemented method of claim 1 further comprising encoding the data to delineate a boundary of a potential well pad, based at least in part on the terrain.

5. The computer-implemented method of claim 4, wherein the first machine learning model determines whether the bounded potential well pad is a source of the gas emission.

6. The computer-implemented method of claim 1 further comprising determining an identity, composition and volume of the gas emission and compare emissions with regulatory requirements.

7. A system comprising:
    a memory having computer readable instructions; and
    one or more processors for executing the computer readable instructions, the computer readable instructions controlling the one or more processors to perform operations comprising:
        detecting, using a first machine learning model, a first well pad at a first location based at least in part on a first set of data comprising spectral data describing a gas emission from the first location;
        detecting an environmental event within a threshold distance of the well pad;
        determining a probability of damage to the first well pad from the environmental event; and
        predicting a suitable location for a second well pad at a second location without a well pad based at least in part on a similarity of a terrain of the second location and the first location and a probability of damage due to the environmental event at the second location.

8. The system of claim 7, wherein the environmental event is a fire, landslide or flooding.

9. The system of claim 7, the operations further comprising extracting, using a second machine learning model, features from the first set of data to determine the terrain of the location.

10. The system of claim 7, the operations further comprising encoding the data to delineate a boundary of a potential well pad, based at least in part on the terrain.

11. The system of claim 10, wherein the first machine learning model determines whether the bounded potential well pad is a source of the gas emission.

12. The system of claim 7, the operations further comprising determining an identity, composition and volume of the gas emission and compare emissions with regulatory requirements.

13. A computer program product comprising a non-transitory computer readable storage medium having program instructions embodied therewith, the program instructions executable by a processor to cause the processor to perform operations comprising:
- detecting, using a first machine learning model, a first well pad at a first location based at least in part on a first set of data comprising spectral data describing a gas emission from the first location;
- detecting an environmental event within a threshold distance of the well pad;
- determining a probability of damage to the first well pad from the environmental event; and
- predicting a suitable location for a second well pad at a second location without a well pad based at least in part on a similarity of a terrain of the second location and the first location and a probability of damage due to the environmental event at the second location.

14. The computer program product of claim 13, wherein the environmental event is a fire or flooding.

15. The computer program product of claim 13, the operations further comprising extracting, using a second machine learning model, features from the first set of data to determine the terrain of the location.

16. The computer program product of claim 13, the operations further comprising encoding the data to delineate a boundary of a potential well pad, based at least in part on the terrain.

17. The computer program product of claim 16, wherein the first machine learning model determines whether the bounded potential well pad is a source of the gas emission.

* * * * *